(12) United States Patent
Tanaka et al.

(10) Patent No.: US 7,150,189 B2
(45) Date of Patent: Dec. 19, 2006

(54) THERMAL-PROCESS-TYPE AIR-FLOW-RATE SENSOR

(75) Inventors: Masaaki Tanaka, Kariya (JP); Toshiya Ikezawa, Oobu (JP)

(73) Assignee: Denso Corporation, Kariya (JP)

( * ) Notice: Subject to any disclaimer, the term of this patent is extended or adjusted under 35 U.S.C. 154(b) by 80 days.

(21) Appl. No.: 11/048,875

(22) Filed: Feb. 3, 2005

(65) Prior Publication Data
US 2005/0178196 A1    Aug. 18, 2005

(30) Foreign Application Priority Data
Feb. 13, 2004    (JP)    ............... 2004-036120

(51) Int. Cl.
*G01F 1/68* (2006.01)
(52) U.S. Cl. .................................. 73/204.26
(58) Field of Classification Search ............ 73/204.26, 73/204.23, 204.22, 118.2, 202.5
See application file for complete search history.

(56) References Cited

U.S. PATENT DOCUMENTS

| | | | | |
|---|---|---|---|---|
| 5,396,795 A | * | 3/1995 | Araki | 73/204.26 |
| 5,631,416 A | * | 5/1997 | Rilling et al. | 73/204.22 |
| 5,723,784 A | * | 3/1998 | Lembke et al. | 73/204.26 |
| 6,176,131 B1 | | 1/2001 | Hecht et al. | |
| 6,553,829 B1 | | 4/2003 | Nakada et al. | |
| 6,591,675 B1 | | 7/2003 | Doderer et al. | |

FOREIGN PATENT DOCUMENTS

| JP | A-H09-26343 | 1/1997 |
|---|---|---|
| JP | A-2001-12986 | 1/2001 |

\* cited by examiner

*Primary Examiner*—Jewel Thompson
(74) *Attorney, Agent, or Firm*—Posz Law Group, PLC (57) ABSTRACT

A sensor element (10) and sensor supporting body (30) are fixed on a jig (80) by adhesive (48) so that a surface (10A) of the sensor element (10) and a surface (30A) of the sensor supporting body (30) agree with each other. Therefore, it is possible to eliminate a step portion between the surface (10A) of the sensor element (10) of the thermal-process-type air-flow-rate sensor and the surface (30A) of the sensor supporting body (30). Accordingly, it is possible to reduce fluctuations in the characteristic of the thermal-process-type air-flow sensor.

2 Claims, 7 Drawing Sheets

THERMAL-PROCESS-TYPE AIR-FLOW-RATE SENSOR

BACKGROUND OF THE INVENTION

1. Field of the Invention

The present invention relates to a thermal-process-type air-flow-rate sensor for measuring an air-flow-rate with a heated resistor. For example, the present invention relates to a thermal-process-type air-flow-rate sensor preferably used for measuring a flow rate of suction air of an internal combustion engine. The present invention also relates to a method of manufacturing the thermal-process-type air-flow-rate sensor.

2. Description of the Related Art

Concerning the air-flow-rate sensor provided in a suction air passage of an internal combustion engine of an automobile, a thermal-process-type air-flow-rate sensor has become the mainstream because a mass flow rate can be directly detected by the sensor. This thermal-process-type air-flow-rate sensor is widely used because the thermal-process-type air-flow-rate sensor having a thin-film-shaped sensor region, which is formed on a semiconductor substrate made of silicon (Si) by applying the semiconductor fine working technique to it, can be relatively easily produced by a mass-production system and, further, this thermal-process-type air-flow-rate sensor can be driven by a little electric power.

Figure 8A:
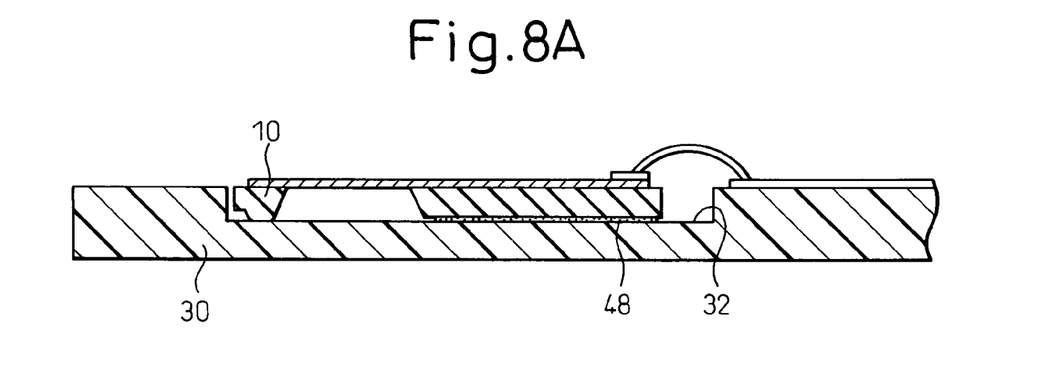
FIGS. 8A and 8B are sectional views showing a thermal-process-type air-flow-rate sensor of the prior art.

Concerning the thermal-process-type air-flow-rate sensor provided with a sensor element having the thin-film-shaped sensor region which is formed on a semiconductor substrate, Japanese Patent Publication No. 9-26343 discloses a floating support structure (a cantilever type supporting structure) in which only one side of the sensor element 10 is bonded to the hollow portion 32 of the sensor support body 30 by the adhesive 48 as shown in FIG. 8A.

In the case where the entire reverse face of the sensor element is bonded to the sensor support body, there is a possibility that the thin-film-shaped sensor region is damaged in the bonding process. Further, according to the condition of using the sensor, there is a high possibility that the bonding portion is damaged by a difference of the coefficient of linear expansion between the sensor element and the sensor support body when the sensor is used being put into a temperature cycle. Accordingly, this type floating type supporting structure is adopted.

Figure 8B:
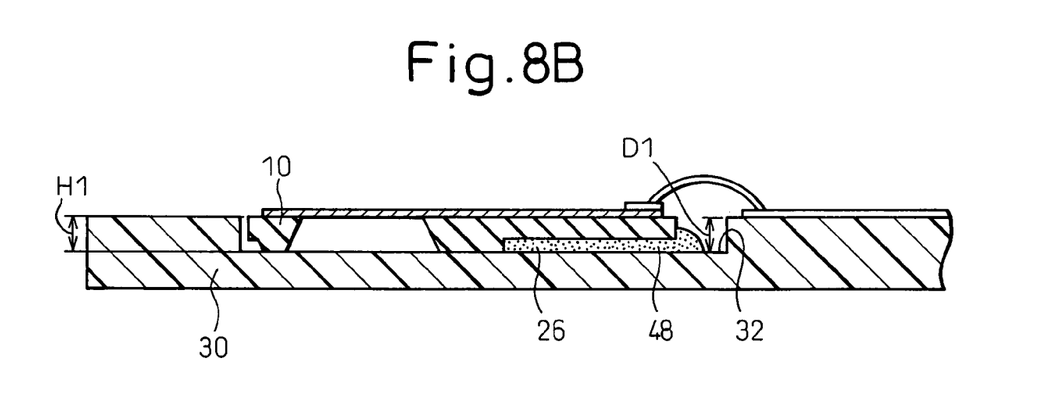

In this case, in the thermal-process-type air-flow-rate sensor, when a step is formed between the sensor element surface and the sensor supporting body surface, a state of the air flow on the sensor element surface is changed, which can be a cause of the fluctuation of the characteristic of the thermal-process-type air-flow-rate sensor in the process of mass production in which the adjustment can not be conducted on the individual sensors. In the structure shown in FIG. 8A, as the thickness of the adhesive 48 fluctuates, it is difficult to keep the surface of the sensor element 10 and the surface of the sensor supporting body 30 on the same plane. Therefore, Japanese Patent Publication No. 2001-12986 discloses a structure in which the groove 26 is provided on the reverse face of the sensor element 10 as shown in FIG. 8B and the sensor element 10 is fixed to the sensor supporting body 30 when the groove 26 is filled with the adhesive 48. According to this structure, as the reverse face of the sensor element 10 directly comes into contact with the bottom face of the hollow portion 32 of the sensor supporting body 30, as long as depth D1 of the hollow portion 32 and thickness H1 of the sensor element 10 agree with each other, the surface of the sensor element 10 and the surface of the sensor supporting body 30 can be maintained on the same plane. In this case, in order to secure the detection accuracy required for engine control, it is necessary to maintain a step, which is formed between the sensor element surface and the sensor supporting body surface, in the range not more than 20 to 30 µm.

As the sensor element 10 is subjected to a polishing step, thickness H1 can be maintained substantially constant in the range of allowance of several µm. However, it is difficult to maintain depth D1 of the hollow portion 32 of the sensor supporting body 30 constant. In the case where the sensor supporting body 30 is made of ceramic, it is difficult to maintain depth D1 of the hollow portion 32 constant (in the range not more than the allowance of 20 to 30 µm) in the process of burning, and the yield is deteriorated. Especially when the sensor supporting body is formed out of resin, depth D1 of the hollow portion 32 fluctuates by 100 µm. Therefore, it is impossible to maintain the step in the range not more than 20 to 30 µm.

SUMMARY OF THE INVENTION

The present invention has been accomplished in order to solve the above problems of the prior art. An object of the present invention is to provide a thermal-process-type air-flow-rate sensor in which a step formed between a sensor element surface and a sensor supporting body surface is eliminated so as to reduce fluctuation of the characteristic of the thermal-process-type air-flow-rate sensor. Another object of the present invention is to provide a method of manufacturing the thermal-process-type air-flow-rate sensor.

In order to accomplish the above object, according to a first aspect of the present invention, there is provided a thermal-process-type air-flow-rate sensor comprising: a detecting element 10 in which a heating resistor 16a is formed on a semiconductor substrate 12 via an insulating layer 14; and a supporting body 30 having a hollow portion 32 into which the detecting element 10 is fixed, characterized in that a filling hole 34 for filling adhesive 48 from a bottom face 30B side of the supporting body 30 is provided on the bottom face 32BT of the hollow portion 32, and the thickness of adhesive 48 for fixing the detecting element 10 to the bottom face 32BT of the hollow portion 32 is adjusted when the adhesive 48 is filled from the filling hole 34 so that a surface 10A of the detecting element 10 and a surface 30A of the supporting body 30 can agree with each other.

According to a third aspect of the present invention, a method of manufacturing a thermal-process-type air-flow-rate sensor which comprises a detecting element 10 in which a heating resistor 16a is formed on a semiconductor substrate 12 via an insulating layer 14 and also comprises a supporting body 30 having a hollow portion 32 into which the detecting element 10 is fixed, is characterized in that the method of manufacturing the thermal-process-type air-flow-rate sensor comprises: a step of putting the detecting element 10 and the supporting body 30 on a jig 80 so that a surface 10A of the detecting element 10 and a surface 30A of the supporting body 30 can be contacted with a flat upper face of the jig 80 under the condition that the detecting element 10 is accommodated in the hollow portion 32 of the supporting body 30; a step of filling adhesive 48 into between a bottom face 10B of the detecting element 10 and a bottom face 32BT of the hollow portion 32 of the supporting body 30 from a filling hole 34 provided on the bottom face 32BT of the hollow portion 32 of the supporting body 30 so that a surface 10A of the detecting body 10 and a surface 30A of the supporting body 30 can agree with each other; and a step of curing the adhesive 48.

According to a fourth aspect of the present invention, a method of manufacturing a thermal-process-type air-flow-rate sensor which comprises a detecting element 10 in which a heating resistor 16a is formed on a semiconductor substrate 12 via an insulating layer 14 and also comprises a supporting body 30 having a hollow portion 32 into which the detecting element 10 is fixed, is characterized in that the method of manufacturing the thermal-process-type air-flow-rate sensor comprises: a step of putting the detecting element 10 on a jig 80 so that a surface 10A of the detecting element 10 can be contacted with a flat upper face of the jig 80; a step of arranging adhesive 48 on a reverse face 10B side of the detecting element 10; a step of putting the supporting body 30 on the jig 80 so that a surface 30A of the supporting body 30 can be contacted with a flat upper face of the jig 80 under the condition that the detecting element 10 is accommodated in the hollow portion 32 and a reverse face 10B of the detecting element 10 is opposed to a bottom face 32BT of the hollow portion 32 via the adhesive 48; and a step of curing the adhesive 48.

In the thermal-process-type air-flow-rate sensor of the first aspect, the thickness of the adhesive 48 for fixing the detecting element 10 to the hollow portion 32 is adjusted in such a manner that the adhesive 48 is filled from the filling hole 34, which is provided on the bottom face 32BT of the hollow portion 32, so that the surface 10A of the detecting element 10 and the surface 30A of the supporting body 30 can agree with each other. Due to the foregoing, it is possible to eliminate the step between the surface 10A of the detecting element 10 of the thermal-process-type air-flow-rate sensor and the surface 30A of the sensor supporting body 30 is eliminated, and the fluctuation of the characteristic of the thermal-process-type air-flow-rate sensor, which cannot be individually adjusted in the process of mass production, can be reduced.

In the thermal-process-type air-flow-rate sensor of the second aspect, as the supporting body 30 is made of resin, the manufacturing cost is low. However, the depth of the hollow portion 32 fluctuates by 100 μm. However, the thickness of the adhesive 48 is adjusted in such a manner that the adhesive 48 is filled so that the surface 10A of the detecting element 10 and the surface 30A of the supporting body 30 can agree with each other. Therefore, it is possible to eliminate the step portion formed between the surface 10A of the detecting element 10 and the surface 30A of the supporting body 30, and the fluctuation of the characteristic of the thermal-process-type air-flow-rate sensor can be reduced in the process of mass production.

In the method of manufacturing a thermal-process-type air-flow-rate sensor of the third aspect, the detecting element 10 is accommodated in the hollow portion 32 of the supporting body 30. Under the condition that the detecting element 10 and the supporting body 30 are put on a flat upper face of the jig 80 so that the surface 10A of the detecting element 10 and the surface 30A of the supporting body 30 can come into contact with the flat upper face, the adhesive 49 is filled from the filling hole 34 into between the reverse face 10B of the detecting element 10 and the bottom face 32BT of the hollow portion 32 of the supporting body 30. Then, the thus filled adhesive 49 is cured. That is, as the detecting element 10 and the supporting body 30 are bonded to each other on the jig 80 under the condition that the surface 10A of the detecting element 10 and the surface 30A of the supporting body 30 agree with each other, it is possible to eliminate the step portion formed between the surface 10A of the detecting element 10 and the surface 30A of the supporting body 30, and the fluctuation of the characteristic of the thermal-process-type air-flow-rate sensor can be reduced in the process of mass production.

In the method of manufacturing a thermal-process-type air-flow-rate sensor of the fourth aspect, under the condition that the detecting element 10 is put on the jig 80 so that the surface 10A of the detecting element 10 can be contacted with a flat upper face of the jig 80, the adhesive 48 is arranged on the reverse face 10B of the detecting element 10. Under the condition that the detecting element 10 is accommodated in the hollow portion 32 and the reverse face 10B of the detecting element 10 is opposed to the bottom face 32BT of the hollow portion 32 via the adhesive 48, the supporting body 30 is put on the flat upper face of the jig 80 so that the surface 30A of the supporting body 30 can be contacted with the flat upper face of the jig 80. Under the above condition, the adhesive 48 is cured. That is, boding is conducted on the jig 80 under the condition that the surface 10A of the detecting element 10 and the surface 30A of the supporting body 30 agree with each other. Therefore, it is possible to eliminate the step formed between the surface 10A of the detecting element 10 of the thermal-process-type air-flow-rate sensor and the surface 30A of the supporting body 30, and the fluctuation of the characteristic of the thermal-process-type air-flow-rate sensor can be reduced in the process of mass production.

In the fifth aspect, curing of the adhesive 48 is conducted under the condition that the surface 10A of the detecting element 10 and the surface 30A of the supporting body 30 come into contact with the flat upper face of the jig 80. Since the adhesive 48 is cured under the condition that the surface 10A of the detecting element 10 and the surface 30A of the supporting body 30 agree with each other, it is possible to eliminate the step formed between the surface 10A of the detecting element 10 of the thermal-process-type air-flow-rate sensor and the surface 30A of the supporting body 30, and the fluctuation of the characteristic of the thermal-process-type air-flow-rate sensor can be reduced in the process of mass production.

The present invention may be more fully understood from the description of preferred embodiments of the invention set forth below, together with the accompanying drawings.

DESCRIPTION OF PREFERRED EMBODIMENTS

Referring to the accompanying drawings, the first embodiment of the present invention will be explained below.

Figure 1:
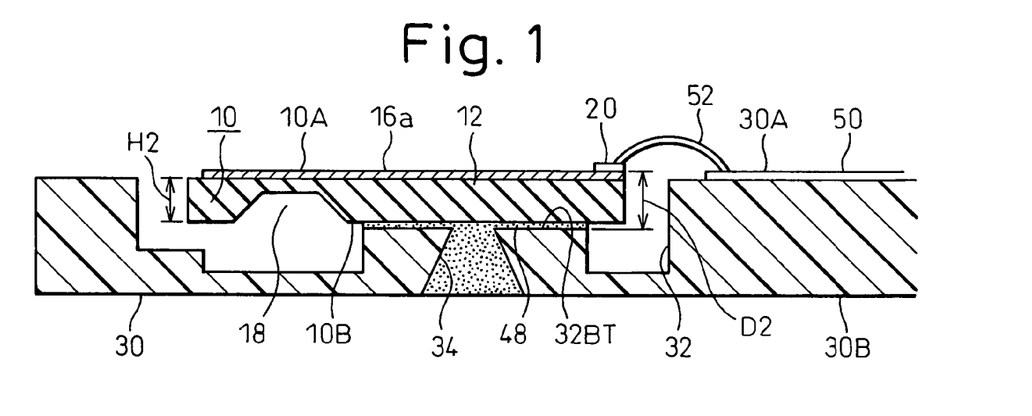
FIG. 1 is a sectional view showing a thermal-process-type air-flow-rate sensor of the first embodiment of the present invention.
Figure 2:
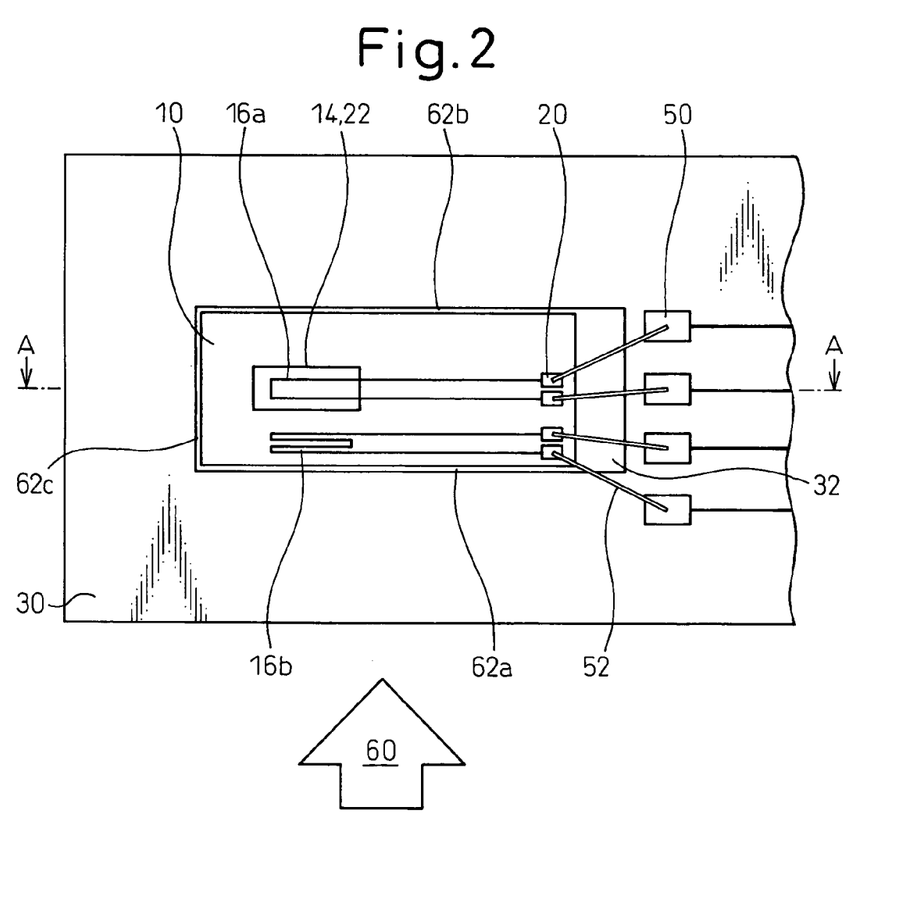
FIG. 2 is a plan view of the thermal-process-type air-flow-rate sensor shown in FIG. 1.

FIG. 1 is a sectional view showing a state in which the sensor element 10 of the first embodiment of the present invention is attached to the sensor supporting body 30 by the adhesive 48. FIG. 2 is a plan view. FIG. 1 is a sectional view taken on line A—A in FIG. 2. The sensor element 10 is manufactured by the semiconductor manufacturing technique in such a manner that the electric insulating layer 14 is formed on the monocrystal silicon substrate 12 and at least one heating resistor 16a and air temperature measuring resistor 16b are provided on the electric insulating layer 14. The protective layer 22 is coated on the heating resistor 16a and air temperature measuring resistor 16b. Below the region of this heating resistor 16a, the cavity portion (the hollow portion) 18 is formed in such a manner that the monocrystal silicon substrate 12 is removed by means of etching. Due to this structure, it is possible to prevent the heat, which is generated by the heating resistor 16a, from being dissipated by the heat conduction through the monocrystal silicon substrate 12.

The heating resistor 16a and the air temperature measuring resistor 16b of the sensor element 10 are connected to the sensor element side electrode 20. This electrode and the electrode 50, which is provided in the signal processing circuit formed on the electric insulating substrate made of resin, are connected to each other by means of bonding of the gold wires 52. By this signal processing circuit, an electric current and voltage are supplied to the sensor element 10 by the well known control system. Further, this signal processing circuit is used for outputting an electric signal from the sensor element 10. For example, the sensor supporting body 30, to which the sensor element 10 is attached, is fixed so that the sensor element 10 can be arranged in the auxiliary passage in the suction air passage of an internal combustion engine. As shown in FIG. 2, the air current 60 is given to the long side of the sensor element 10.

In this case, in the example shown in the drawing, the long side of the sensor element 10 is 6 mm long, the short side is 2.5 mm long and the thickness is 0.3 mm. On the other hand, the sensor supporting body 30 is made of resin. In the sensor supporting body 30, the hollow portion 32 is formed and the filling hole for filling the adhesive 48 is formed right below the hollow portion 32. The adhesive 48 is added between the protruding bottom face 32BT of the hollow portion 32 and the reverse face 10B of the sensor element 10. The hollow portion 32 is formed into a shape in which the sensor element 10 can be completely accommodated. Depth D2 of the hollow portion 32 (the depth on the protruding bottom face 32BT for supporting the sensor element in the hollow portion 32) is a little larger than thickness H2 of the sensor element 10, for example, the depth D2 of the hollow portion 32 is approximately 0.32 mm in the example shown in the drawing. Between the side wall of the hollow portion 32 and the sensor element 10, the gaps 62a, 62b, 62c are formed.

In the thermal-process-type air-flow-rate sensor of the first embodiment, the sensor element 10 is fixed to the protruding bottom face 32BT of the bottom portion of the hollow portion 32 provided in the sensor supporting body 30 by the adhesive 48. In this case, the thickness of the adhesive 48, which fixes the sensor element 10 to the protruding bottom face 32BT of the hollow portion 32, is adjusted by filling the adhesive 48 from the filling hole 34, which is provided on the protruding bottom face 32BT, so that the surface 10A of the sensor element 10 and the surface 30A of the sensor supporting body 30 can agree with each other. Therefore, it is possible to eliminate a step portion formed between the surface 10A of the sensor element 10 and the surface 30A of the sensor supporting body 30, and fluctuation of the characteristics of the thermal-process-type air flow sensors produced in the mass production system can be reduced.

In the thermal-process-type air flow sensor of the first embodiment, as the sensor supporting body 30 is made of resin, the manufacturing cost is low. On the other hand, the depth of the hollow portion 32 fluctuates by 100 μm. However, the thickness of the adhesive 48 is adjusted by filling the adhesive 48 so that the surface 10A of the sensor element 10 and the surface 30A of the sensor supporting body 30 can agree with each other. Due to the foregoing, the step portion between the surface 10A of the sensor element 10 and the surface 30A of the sensor supporting body 30 can be eliminated. In this connection, in the first embodiment, the sensor supporting body 30 is made of resin, however, the sensor supporting body 30 can be also made of ceramics such as alumina.

The manufacturing process of the sensor element 10 will be explained as follows.

Figure 3:
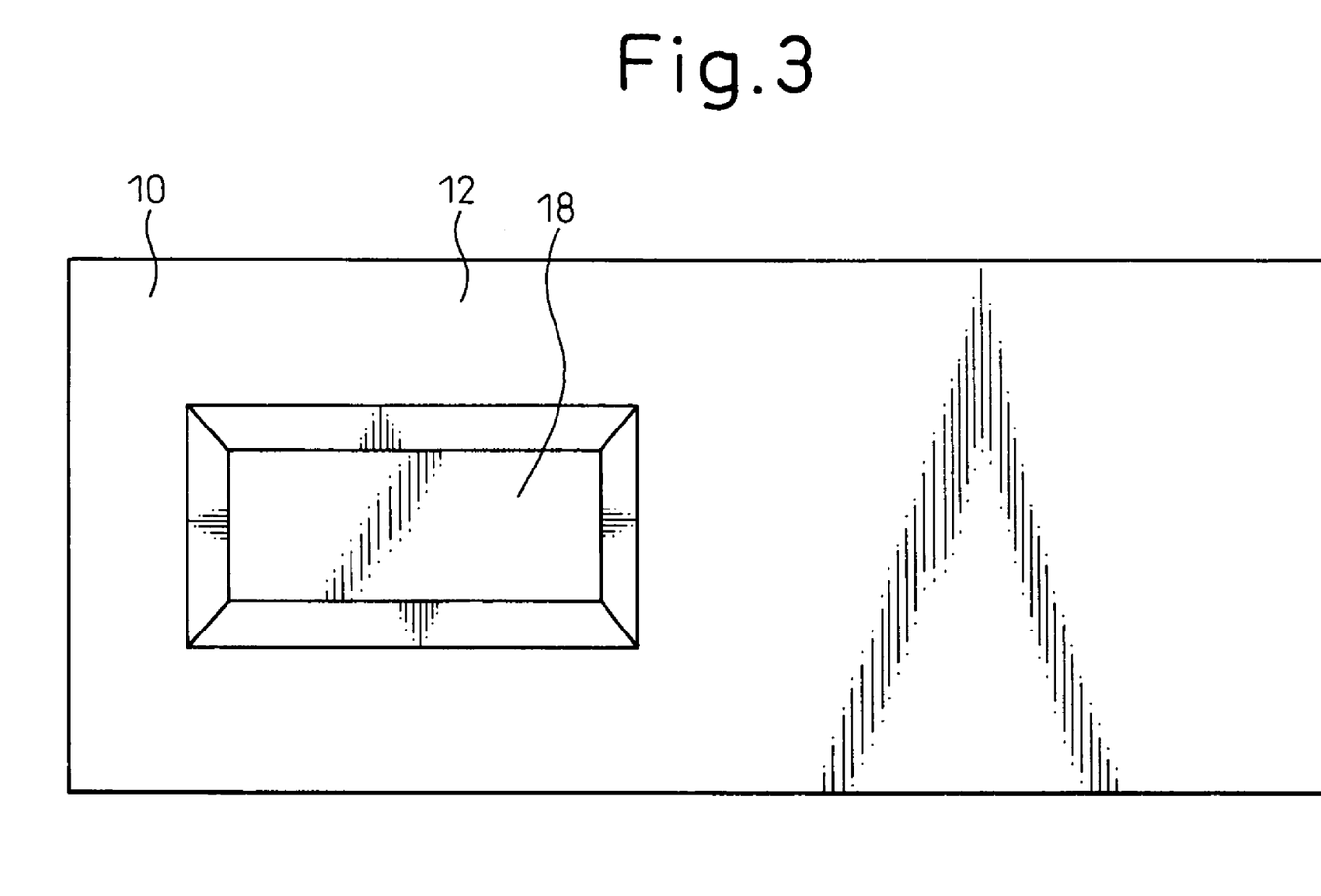
FIG. 3 is a plan view of the reverse side of the sensor element shown in FIG. 1.
Figure 4:
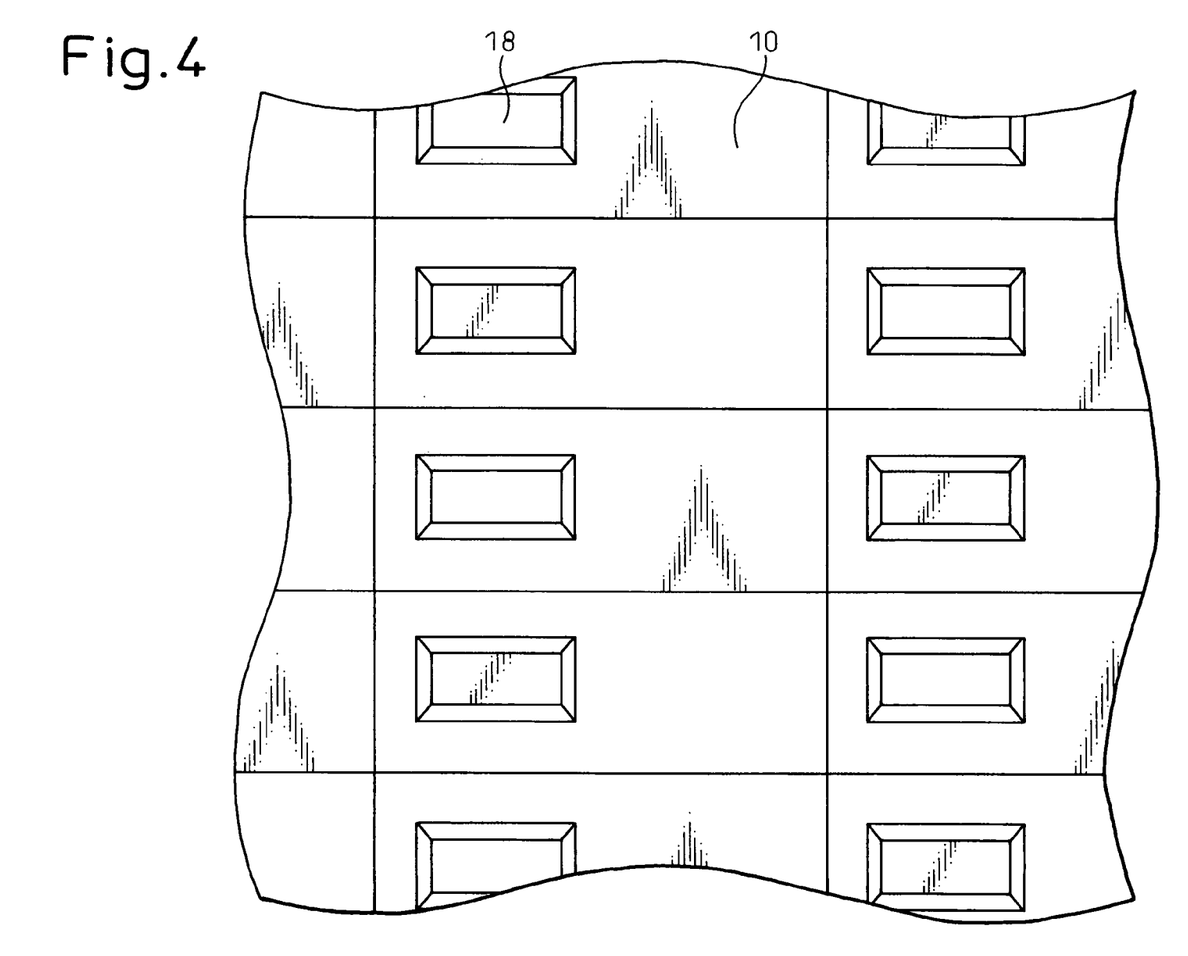
FIG. 4 is a partial plan view showing a state on the reverse side of the sensor element shown in FIG. 3 before the division to chips.

FIG. 3 is a plan view of the reverse side of the sensor element 10 shown in FIG. 1, and FIG. 4 is a partial plan view showing a state on the reverse side of the sensor element 10 shown in FIG. 3 before the division of chips. On the monocrystal silicon substrate 12, a layer of silicon dioxide is formed as the electric insulating layer 14 by means of thermal oxidation or CVD (Chemical Vapor Deposition). After that, a layer of silicon nitride is formed by means of CVD. Next, a layer of polycrystal silicon is formed by means of CVD, and phosphorus impurities are doped by means of thermal diffusion or ion injection. After that, a layer of resist is formed into a predetermined shape by the well known technique of photolithography. When the polycrystal silicon layer is subjected to patterning by the method of reactive ion etching, the heating resistor 16a and the air temperature measuring resistor 16b are formed. Next, as the protective layer 22, a layer of silicon nitride is formed by means of CVD, and then a layer of silicon dioxide is formed by means of CVD. After that, the protective layer in the portion, in which the electrode 20 is formed, is removed by means of etching, and the electrode 20 is formed out of aluminum. Finally, in order to form the cavity portion 18, a layer of silicon nitride is formed on the surface of the monocrystal silicon substrate 12, on which the heating resistor 16a is not formed, by means of CVD, and a layer of resist is formed into a predetermined shape by the well known technique of photolithography using a mask not shown in the drawing. Then, patterning is conducted by means of ion etching. After that, anisotropic etching is conducted so as to form the cavity portion 18 (shown in FIG. 4). After that, it is divided into chips by means of dicing (shown in FIG. 3).

Referring to FIG. 5, attaching of the sensor element 10 to the sensor supporting body 30 will be explained below.

Figure 5A:
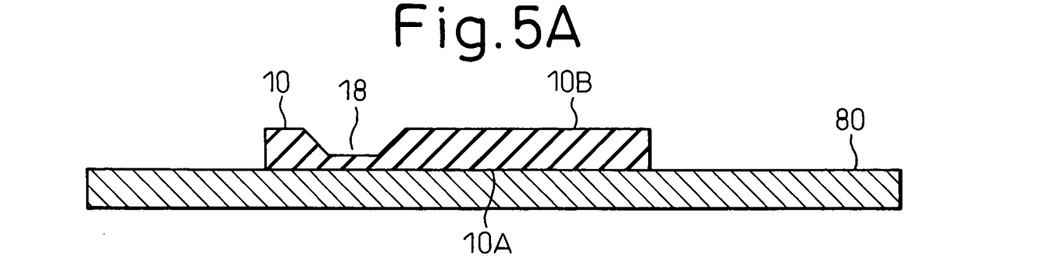
FIGS. 5A to 5D are process charts showing a process of attaching the sensor element to the sensor supporting body of the first embodiment.
Figure 5B:
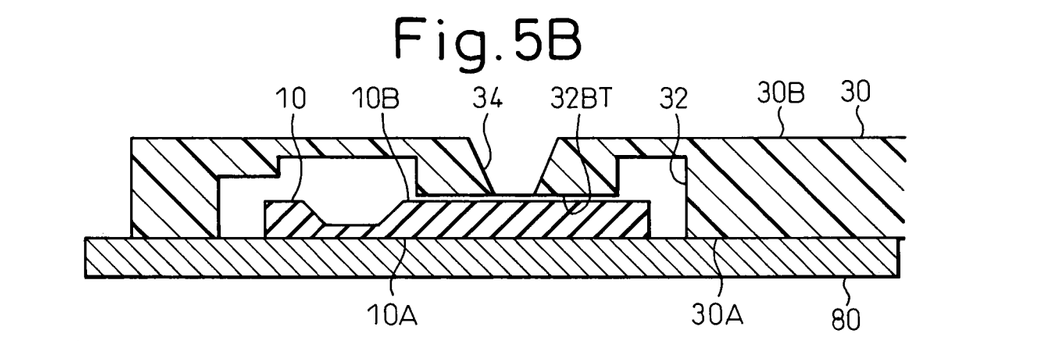
Figure 5C:
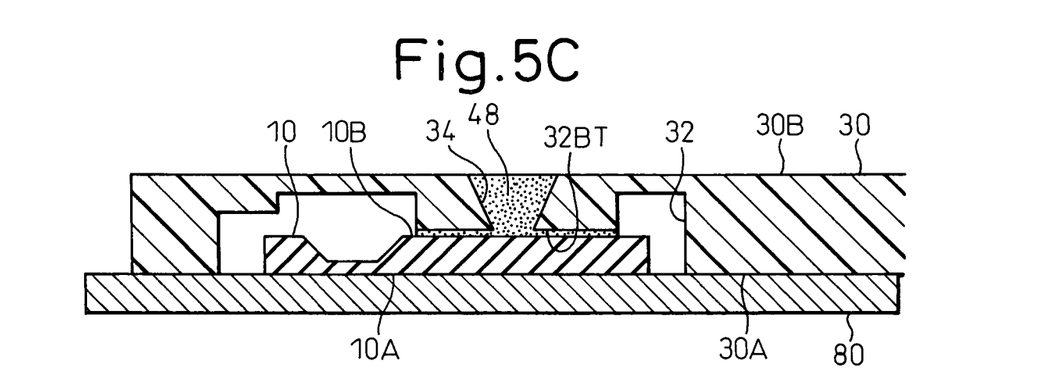
Figure 5D:
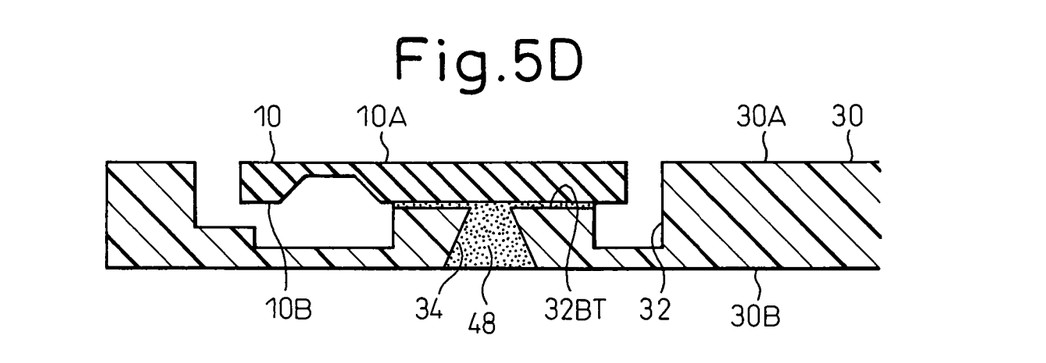

First, the sensor element 10 is put on the jig 80 so that the surface 10A of the sensor element 10 can be set on a flat upper face of the jig 80 (shown in FIG. 5A). Next, the sensor supporting body 30 is put on the jig 80 so that the sensor element 10 can be accommodated in the hollow portion 32 and the surface 30A of the sensor supporting body 30 can be contacted with an upper face of the jig 80 (shown in FIG. 5B). Under this condition, a step portion formed between the surface 30A of the sensor supporting body and the surface 10A of the sensor element 10 can be eliminated, and an inclination of the sensor element 10 with respect to the sensor supporting body 30 can be made to be zero. After that, the adhesive 48 is filled into between the reverse face 10B of the sensor element 10 and the protruding bottom face 32BT of the hollow portion 32 from the filling hole 34, which is provided on the protruding bottom face 32BT of the hollow portion 32 of the sensor supporting body 30, so that the surface 10A of the sensor element 10 and the surface 30A of the sensor supporting body 30 can agree with each other. Under this condition, the adhesive 48 is cured (shown in FIG. 5C). When the sensor element 10 and the sensor supporting body 30 are detached from the jig 80 and inverted, attaching of the sensor element 10 to the sensor supporting body 30 is completed (shown in FIG. 5D). In this connection, concerning the adhesive 48, it is possible to use a thermosetting type resin such as epoxy resin. In this case, clearance formed between the reverse face 10B of the sensor element 10 and the protruding bottom face 32BT of the hollow portion 32 is small. Therefore, when the adhesive 48 is filled into between the reverse face 10B of the sensor element 10 and the protruding bottom face 32BT of the hollow portion 32, the adhesive 48 can be uniformly filled by the capillary phenomenon without leaving air between the reverse face 10B of the sensor element 10 and the protruding bottom face 32BT of the hollow portion 32. Since the protruding bottom face 32BT is somewhat protruded from the other bottom portion of the hollow portion 32, a flow of the adhesive 48 is stopped at the end portion of the protruding bottom face 32BT. Therefore, unless an excessively high pressure is given to the adhesive 48 in the process of filling the adhesive 48, there is no possibility that the adhesive overflows from the end portion of the protruding bottom face 32BT.

According to the method of manufacturing a thermal-process-type air-flow-rate sensor of the first embodiment, the sensor element 10 is accommodated in the hollow portion 32 of the sensor supporting body 30. Under the condition that the sensor element 10 and the sensor supporting body 30 are put on the jig 80 so that the surface 10A of the sensor element 10 and the surface 30A of the sensor supporting body 30 can be contacted with a flat upper face of the jig 80, the adhesive 48 is added from the filling hole 34 between the reverse face 10B of the sensor element 10 and the protruding bottom face 32BT of the hollow portion 32 of the sensor supporting body 30, and then the adhesive 48 is cured. That is, the adhesion is accomplished under the condition that the surface 10A of the sensor element 10 and the surface 30A of the sensor supporting body 30 agree with each other and the sensor element 10 is not inclined, at all, with respect to the sensor supporting body 30. Therefore, it is possible to eliminate the step portion between the surface 10A of the sensor element 10 of the thermal-process-type air-flow-rate sensor and the surface 30A of the sensor supporting body 30 and it is also possible to eliminate an inclination of the sensor element 10. Accordingly, fluctuation of the characteristics of the thermal-process-type air-flow-rate sensor can be reduced in the process of mass production.

Successively, referring to FIGS. 6 and 7, the method of manufacturing a thermal-process-type air-flow-rate sensor of the second embodiment of the present invention will be explained below.

Figure 6:
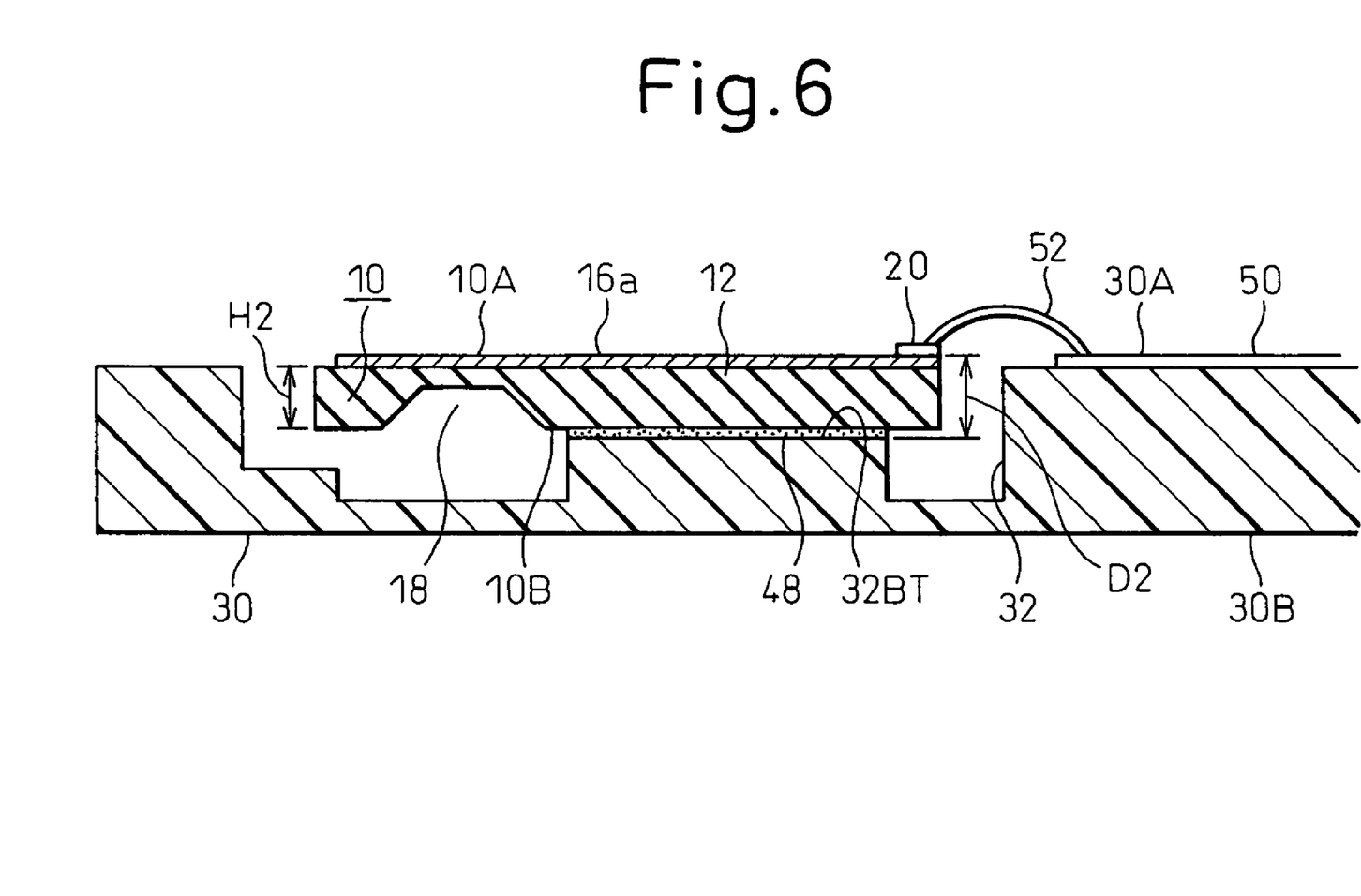
FIG. 6 is a sectional view showing a thermal-process-type air-flow-rate sensor of the second embodiment of the present invention.

FIG. 6 is a sectional view showing a state in which the sensor element 10 of the second embodiment of the present invention is attached to the sensor supporting body 30 by the adhesive 48.

In the first embodiment described above, in which FIG. 1 is referred to, the filling hole for filling the adhesive is provided in the sensor supporting body 30. However, in the second embodiment, the filling hole is omitted.

Referring to FIG. 7, attaching of the sensor element 10 to the sensor supporting body 10 in the second embodiment will be explained below.

Figure 7A:
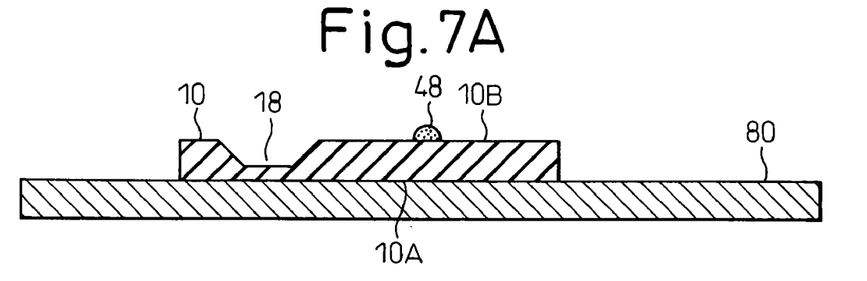
FIGS. 7A to 7D are process charts showing a process of attaching the sensor element to the sensor supporting body of the second embodiment.
Figure 7B:
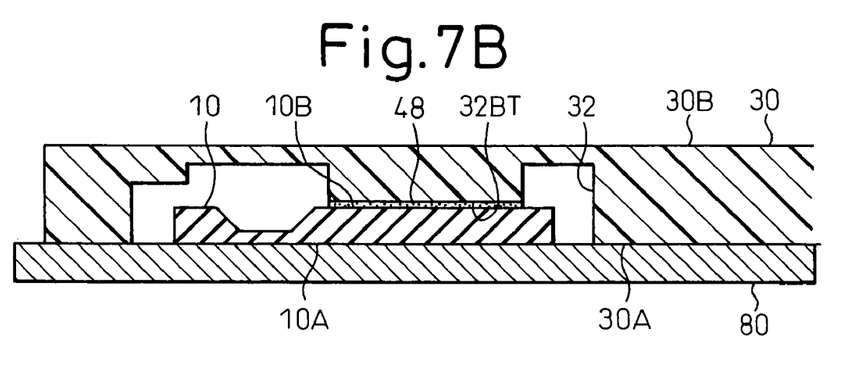
Figure 7C:
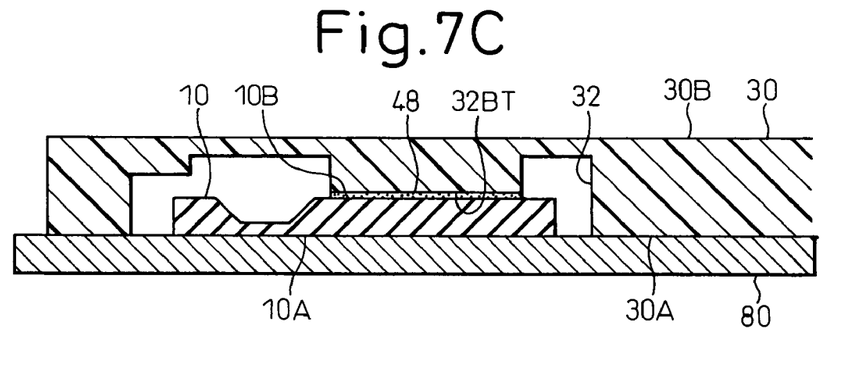
Figure 7D:
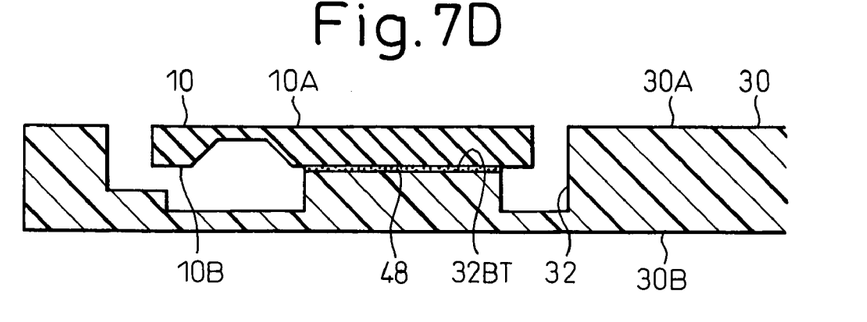

First, the sensor element 10 is put on the jig 80 so that the surface 10A of the sensor element 10 can be contacted with a flat upper face of the jig 80, and then the adhesive 48 is put on the reverse side 10B (shown in FIG. 7A). Next, the sensor supporting body 30 is put on the jig in such a manner that the surface 30A of the sensor supporting body 30 is put on an upper face of the jig 80 so that the sensor 10 can be accommodated in the hollow portion 32 (shown in FIG. 7B). In this case, under the condition that the surface 10A of the sensor element 10 and the surface 30A of the sensor supporting body 30 agree with each other, the adhesive 48 spreads between the reverse face 10B of the sensor element 10 and the protruding bottom face 32BT of the hollow portion 32. After that, the adhesive 48 is cured under this condition (shown in FIG. 7C). Due to the foregoing, attaching of the sensor element 10 to the sensor supporting body 30 is completed (FIG. 7D).

According to the thermal-process-type air-flow-rate sensor of the second embodiment, under the condition that the sensor element 10 is put on the jig 80 so that the surface 10A of the sensor element 10 can be contacted with a flat upper face of the jig 80, the adhesive 48 is arranged on the reverse face 10B of the sensor element 10. Under the condition that the sensor supporting body 30 is arranged on the jig in such a manner that the sensor element 10 is accommodated in the hollow portion 32 and the reverse face 10B of the sensor element 10 is opposed to the bottom face 32BT of the hollow portion 32 via the adhesive 48 and the surface 30A of the sensor supporting body 30 is contacted with the flat upper face of the jig 80, the adhesive 48 is cured. That is, adhesion is conducted under the condition that the surface 10A of the sensor element 10 and the surface 30A of the sensor supporting body 30 agree with each other on the jig 80. Therefore, it is possible to eliminate a step portion between the surface 10A of the sensor element 10 of the thermal-process-type air-flow-rate sensor and the surface 30A of the sensor supporting body 30. Accordingly, fluctuation of the characteristics of the thermal-process-type air-flow-rate sensor can be reduced in the process of mass production.

While the invention has been described by reference to specific embodiments chosen for purposes of illustration, it should be apparent that numerous modifications could be made thereto by those skilled in the art without departing from the basic concept and scope of the invention.

The invention claimed is:

1. A thermal-process-type air-flow-rate sensor comprising: a detecting element in which a heated resistor is formed on a semiconductor substrate via an insulating layer; and a supporting body having a hollow portion into which the detecting element is fixed, wherein
a filling hole for filling adhesive from a bottom face side of the supporting body is provided on the bottom face of the hollow portion, and
the thickness of adhesive for fixing the detecting element to the bottom face of the hollow portion is adjusted when the adhesive is filled from the filling hole so that a surface of the detecting element and a surface of the supporting body can agree with each other.

2. A thermal-process-type air-flow-rate sensor according to claim 1, wherein the supporting body is made of resin.

* * * * *